Feb. 9, 1943.  A. PELTZER ET AL  2,310,651
STARCH MANUFACTURING PROCESS
Filed April 8, 1938   5 Sheets-Sheet 1
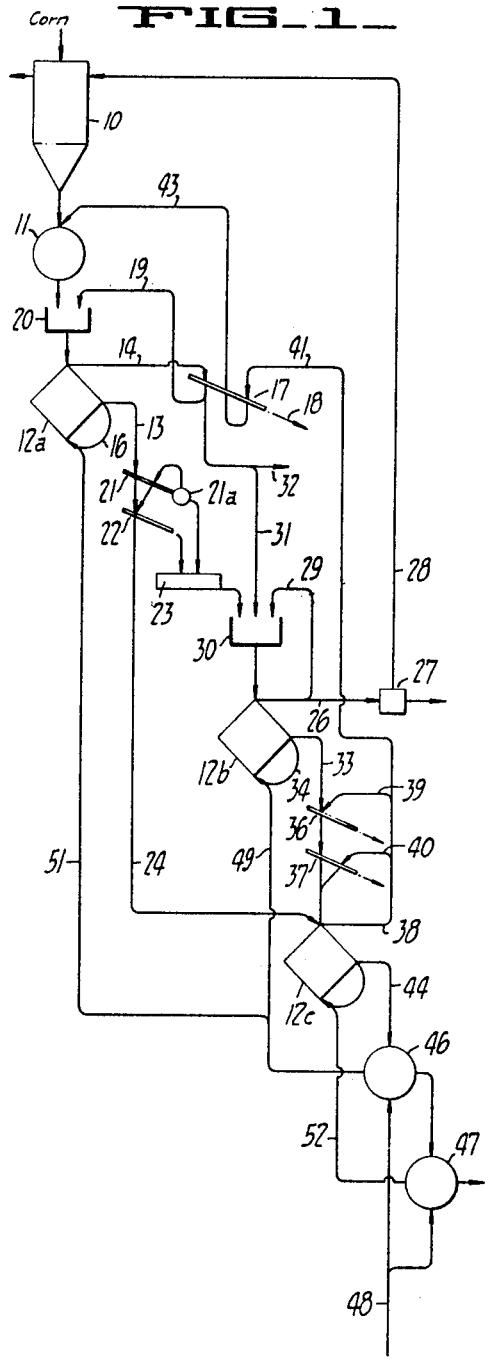
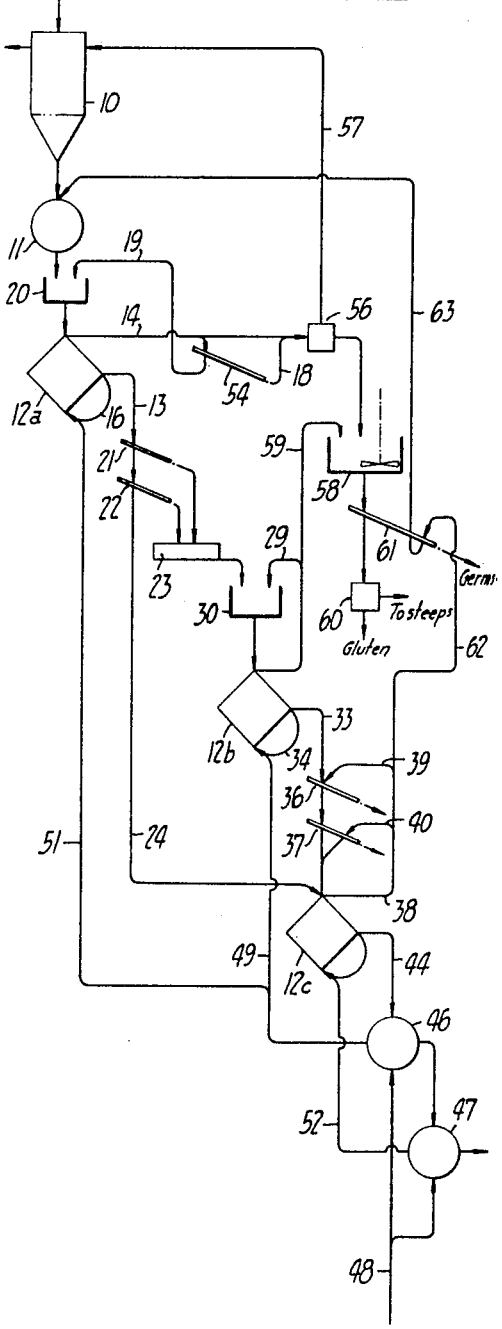
INVENTORS
ALBERT PELTZER
ALBERT PELTZER JR.
BY Paul D. Flehr
ATTORNEY.

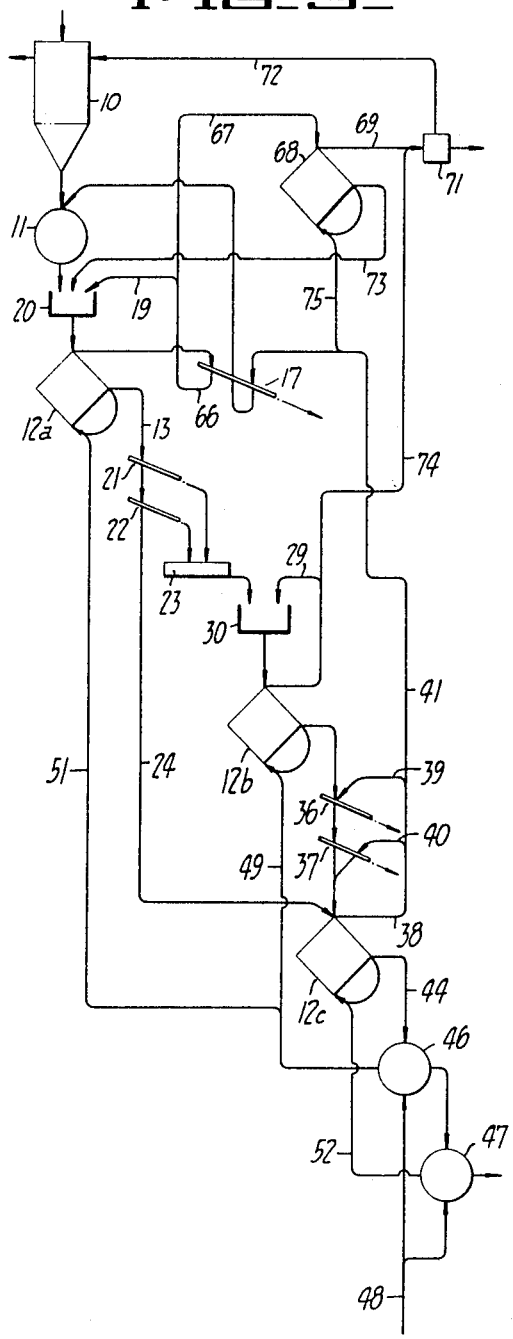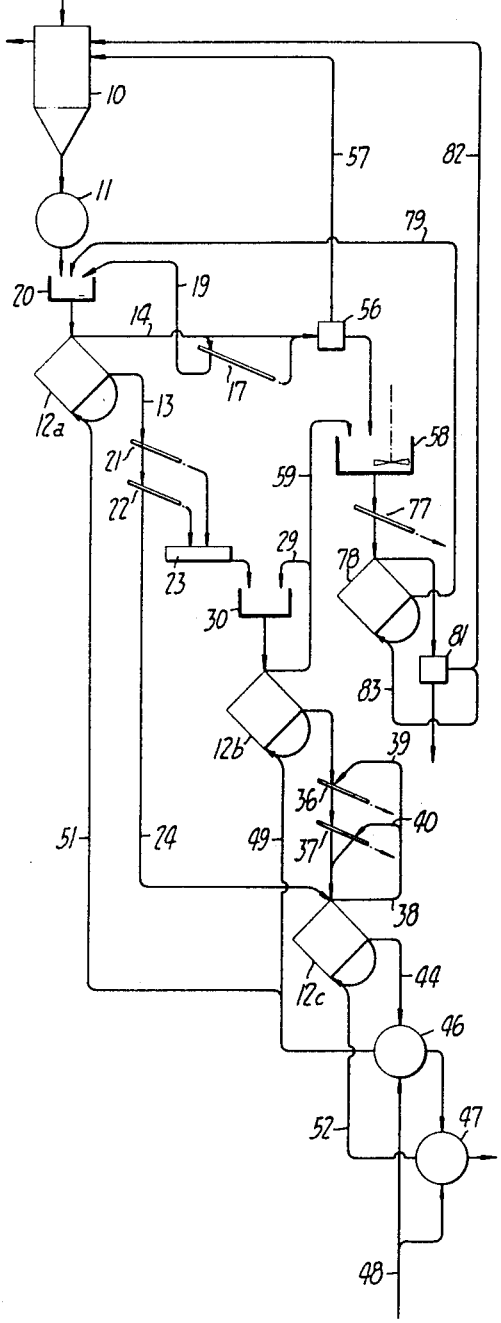

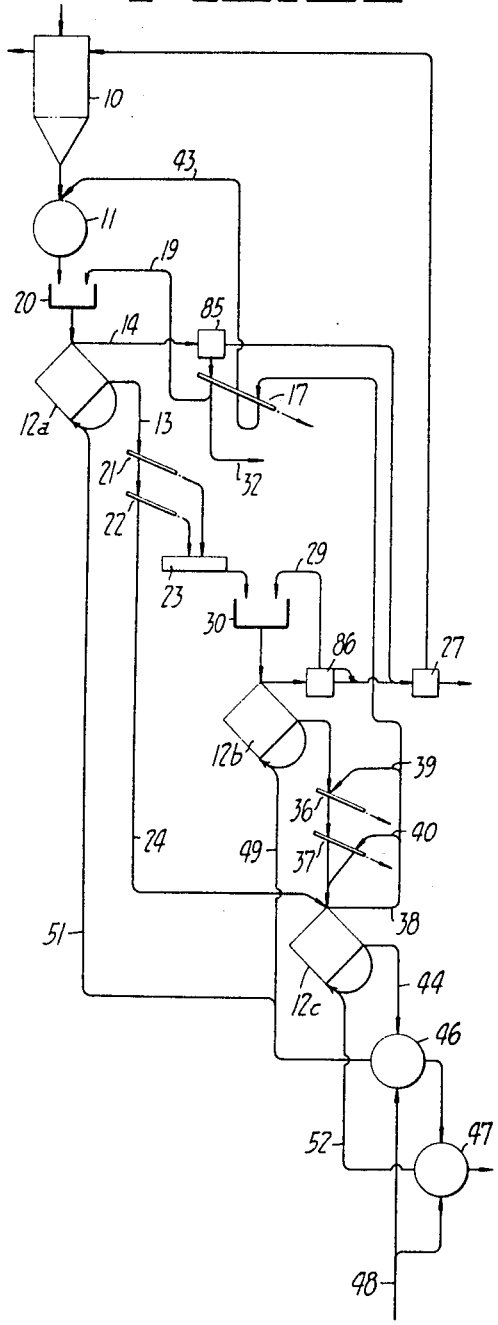
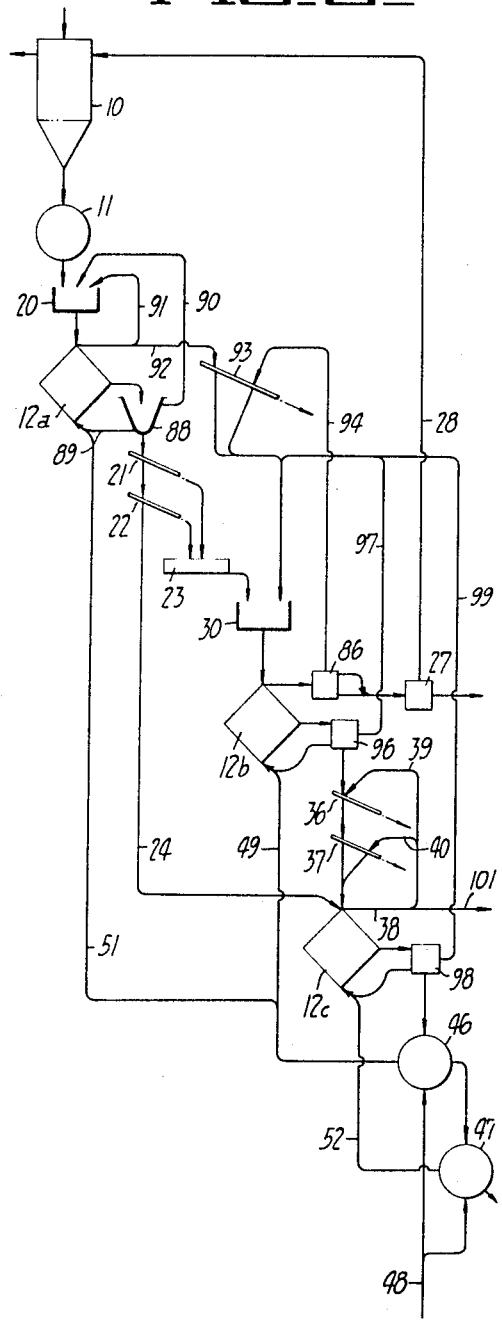

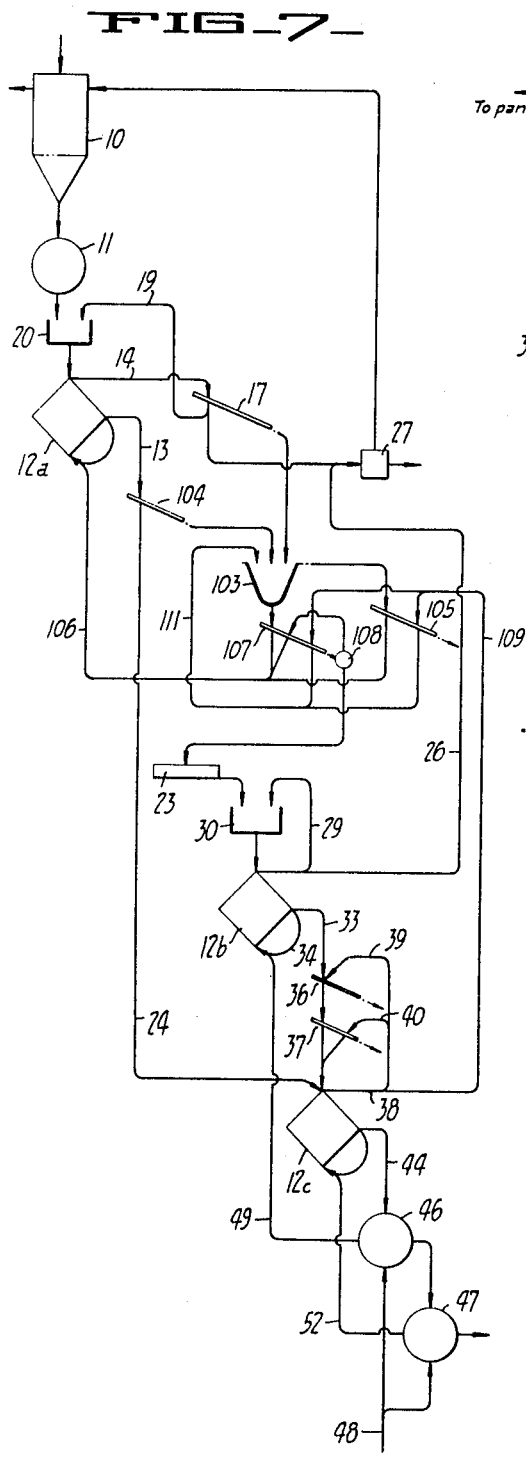
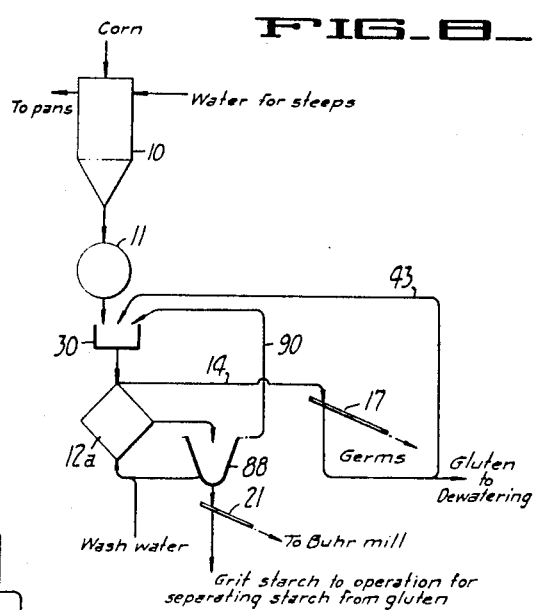
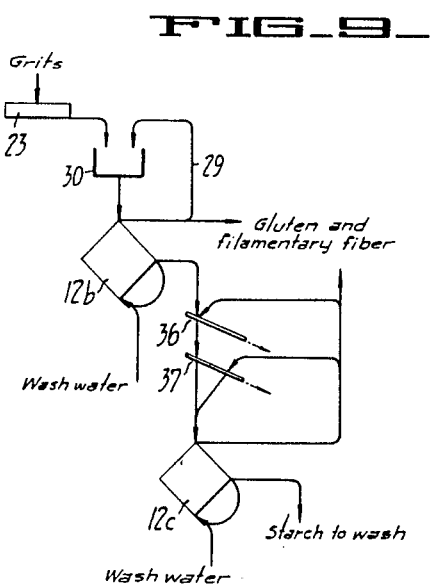

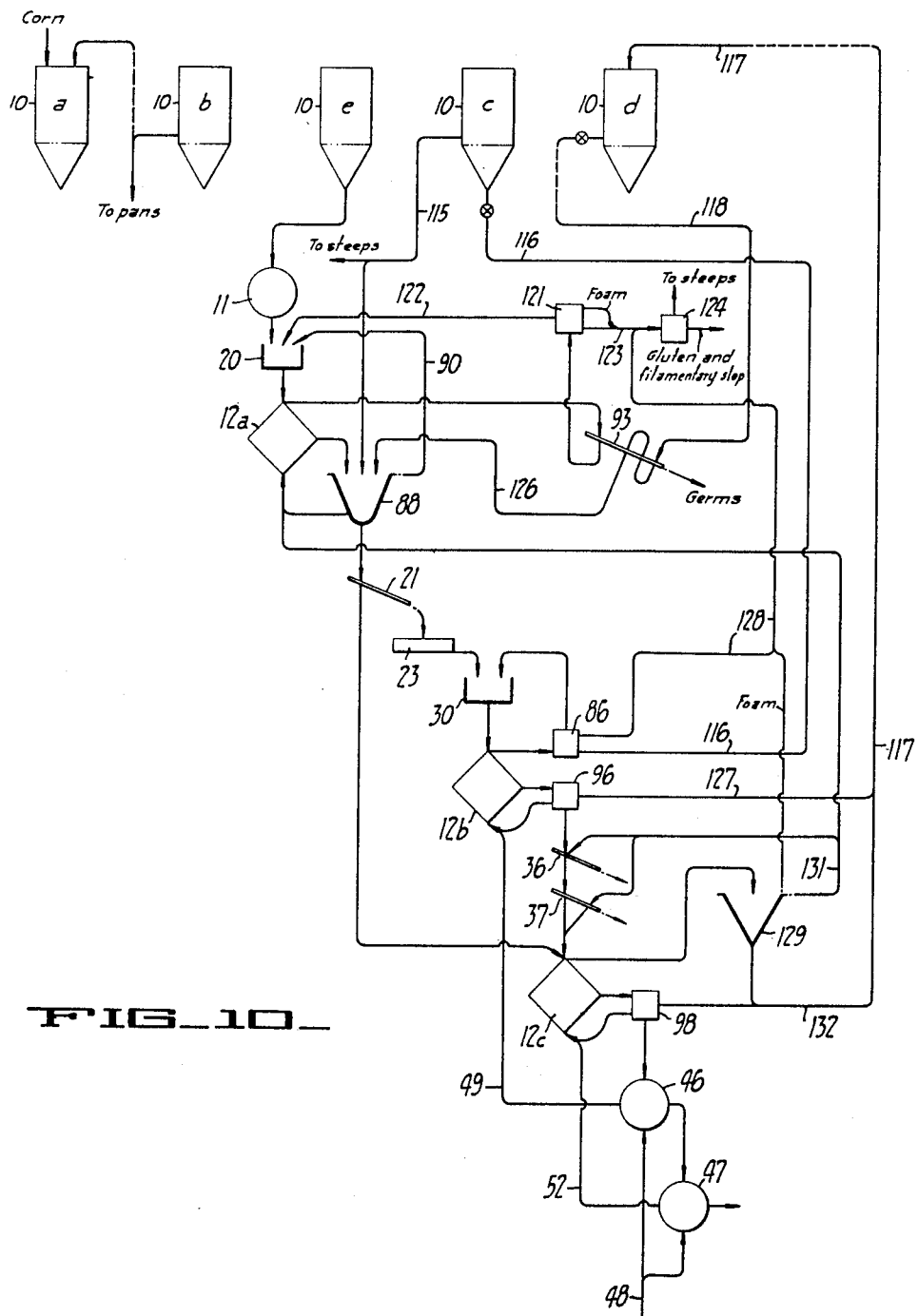
FIG_10

Patented Feb. 9, 1943

2,310,651

UNITED STATES PATENT OFFICE 2,310,651

STARCH MANUFACTURING PROCESS

Albert Peltzer and Albert Peltzer, Jr., San Francisco, Calif., assignors to Merco Centrifugal Company, San Francisco, Calif., a corporation of California Application April 8, 1938, Serial No. 200,896

27 Claims. (Cl. 127—68)

This invention relates generally to wet starch manufacturing processes, in which starch is manufactured from materials like Indian corn, by operations involving disintegration of the corn and separation of components including germs, hulls, fibrous material and gluten, from the starch.

Continuous centrifuges of the Peltzer type have proven effective in the wet starch process, for the separation of starch from gluten. Such centrifuges are characterized by continuous operation and by continuous return of a major part of the underflow back into the separating chamber. They are disclosed in Peltzer et al. Patents 1,923,454; 1,923,455; 1,933,119; 1,945,786 and 2,060,239. One arrangement for making use of a Peltzer centrifuge for primary separation, in place of tabling, is shown in Peltzer 2,097,531. Briefly, in that instance the feed to the centrifuge is comparable to a mill starch stream such as is supplied to conventional starch tables, except that it is of higher gravity. As disclosed and claimed in co-pending application Serial No. 743,528, silk screening prior to primary separation of starch from gluten, can be omitted prior to the centrifugal treatment, whereby a considerable part of the fiber passes out with the gluten overflow, leaving the remainder in the starch underflow for removal by silk screening.

Systems of the above character possess certain advantages over prior conventional systems using starch tables for separation of starch from gluten. However, a filter has been thought desirable if not necessary, before the first centrifuge, to afford a source of wash water, and in order to afford a feed of proper gravity to the centrifuge. Also such systems have made use of many conventional operations, like the separation of germs, without material modification.

The present invention has for its object the further simplification of starch manufacturing processes of the type which make use of centrifuges for certain separating operations.

More particularly, it is an object of the invention to make possible elimination of a filter preceding the first centrifuge stage, and the re-arrangement of the process so that there is no longer any need for wash water to be made available by such a filter.

A further object of the invention is to provide a process whereby separation of germs from the cracked corn is greatly simplified, and is carried out upon a separated component of the cracked material, rather than from all of the material leaving the crackers. In attaining this object we provide a stage of centrifugal separation immediately following the crackers, and to which all of the material from the crackers is directly supplied. The germ separating operation follows this centrifugal separating operation.

Another object of the invention is to provide a process whereby the removal of both coarse and fine slop, is omitted from operations preceding primary separation. In the present process screening operations for removal of both coarse and fine fiber, follow centrifugal separation of starch from other material.

Another object of the invention is to afford means whereby contaminated liquors from the process can be clarified without detrimentally affecting various operations of the process. In accomplishing this object we make use of steeped corn as a filtration medium, prior to delivering the steeped corn to the crackers.

Further objects of the invention will appear from the following description in which the preferred embodiment of the invention has been set forth in detail in conjunction with the accompanying drawings.

Referring to the drawings:

The flow sheet of Fig. 1 will serve to illustrate certain features of the present invention, particularly with respect to direct centrifuging of material delivered by the crackers, and removal of both coarse and fine fibrous material after centrifugal separation of starch. The process as outlined in this flow sheet, is as follows: The corn or like starch-bearing material is first subjected to conventional steeping in steeps 10, and the steeped material is supplied to the conventional crackers 11.

According to conventional processes, the cracked material is subjected to screening for removal of a starch-gluten liquor, and is treated in germ separators, for removal of germs. The remaining hulls and grits are then delivered to a Buhr mill, for grinding and further separating operations.

According to our process conventional starch and germ separating operations are eliminated at this point, and all of the cracked material is delivered to the centrifuge 12a. This centrifuge can be constructed in accordance with the disclosures of patents previously mentioned, provided proper precautions are made for handling material containing whole germs and also grits of appreciable size. Thus in practice the separating chamber, the overflow passages, and the underflow discharge orifices are so proportioned that such material can be handled without clogging. As a result of this centrifuge treatment a separation takes place whereby grits, hulls and finely divided starch pass out in the underflow 13, and gluten and germs pass out in the overflow 14. The gluten in the overflow represents gluten freed by cracking of the corn, and can be termed "free gluten."

A relatively large part of the underflow is continuously delivered back into the centrifuge separating chamber, by the return circuit 16. This return not only subjects the underflow material to further separation, but also subjects the grits to attrition to increase the relative percentage of finely divided starch.

The overflow 14 is shown being subjected to a coarse screening operation 17, consisting for example of copper screens. The tailings (line 18) consist of germs, and can be delivered to conventional germ dryers. A part of the gluten water passing through screen 17, represented by line 19, is used for a pulping operation 20, to dilute the material supplied from the crackers 11, before introduction of the same as a feed into the centrifuge. By this arrangement the feed for the centrifuge 12a is of the gravity desired, without using an extraneous source of diluting liquor, such as would further dilute the overflow 14.

The underflow 13 from centrifuge 12a is subjected to the screening operations 21 and 22, which may represent copper and silk screens respectively. If desired one or more expellers 21a can be employed to lower the moisture content of the tailings. The tailings from screens 21 and 22 consist largely of grits and hulls, and these grits and hulls are delivered to the Buhr mill 23 for grinding. The material passing through screens 21 and 22, represented by line 24, consists mainly of a suspension of finely divided starch, with a minor contaminating gluten content.

The ground material supplied by the Buhr mill 23, is now introduced into a second centrifuge 12b. This centrifuge can be similar to centrifuge 12a, except that it need not be designed for the handling of grits. A part 26 of the gluten overflow from centrifuge 12b, is shown being supplied to the gluten dewatering equipment 27, such as a filter, and the recovered liquor 28 is shown being supplied to the steeps 10, for the steeping operation. Another part 29 of the gluten overflow from centrifuge 12b, can be diverted and mixed with the ground material from Buhr mill 23, in the pulping operation 30, to make up the feed to the centrifuge. The pulping operation 30 is also shown receiving gluten liquor 31, representing a part of the gluten liquor passing through the screens 17. Another part of the gluten liquor passed through the germ separating screens 17, can be bled away for special treatment, as indicated by line 32, as it contains less filamentary slop.

There is a relatively sharp separation between starch and gluten in centrifuge 12b. There is also a classification and separation of fibrous material contained in the ground material from Buhr mill 23, as disclosed and claimed in copending application Serial No. 651,701, filed January 14, 1933. Fine fibrous material, generally of a filamentary nature, passes out with the gluten overflow 26, and is removed with the gluten in the filter press 27. The remaining fibrous material passes out with the starch underflow 33. Centrifuge 12b is also provided with a return circuit 34, whereby a large proportion of the material as discharged is continuously returned back into the centrifuge chamber.

The starch underflow 33 drawn off from centrifuge 12b, is subjected to screening operations for the removal of all the contained fibrous material. These screening operations, indicated at 36 and 37, can be carried out by copper and silk screens respectively. The fiber removed by coarse screening or copper screens, from screening operation 36, represents coarse slop, and that removed by the fine or silk screens in the operation 37, represents fine slop.

The starch liquor passing through the screens is supplied to the final pass or clean-up centrifuge 12c. The overflow 38 from centrifuge 12c is relatively uncontaminated with gluten, compared with the overflows from centrifuges 12a and 12b. Therefore it can be used for different operations in the system, where wash water is required. Thus portions 39 and 40 of this overflow are being used as a wash for the screening operations 36 and 37. Another part 41 is used as a wash for the germs in the last stages of the screening operation 17, as indicated, and after serving as a wash for the germs the resulting liquor (line 43) is supplied to the crackers 11.

The starch underflow 44 from centrifuge 12c, is now supplied to the starch filters 46 and 47. Both these filters are supplied with clean wash water 48, and the relatively uncontaminated filtrates recovered from these filtering operations, are used in various parts of the process. Thus the filtrate from filter 46 is used as a wash in the return circuits 16 and 34 of centrifuges 12a and 12b, as indicated by lines 49 and 51. Filtrate 52 from filter 47 is used as a wash in the final pass centrifuge 12c.

In the foregoing reference is made to the use of wash water introduced into the return circuits of centrifuges 12a, 12b and 12c. Use of wash water in this manner is described in the previously mentioned Peltzer centrifuge patents. Briefly, wash water introduced in this manner serves to displace liquid in the feed material, with respect to solids in the underflow. Thus the solids in the underflow are discharged with liquid from the wash in place of liquid carried into the centrifuge with the feed. The displaced liquid with the feed material passes out with the overflow. The amount of wash liquor can be adjusted in accordance with requirements as disclosed in Peltzer No. 2,097,531.

The system described above departs radically from conventional wet starch manufacturing processes. Insofar as we are aware no one heretofore has carried out a centrifugal separating operation directly upon material leaving the crackers. As previously pointed out, this arrangement enables a considerable saving in the equipment required, because no filter need be employed ahead of the first stage of centrifugal separation, and in addition the removal of germs is greatly simplified. A further characteristic of of the process described above is that the removal of both coarse and fine slop follows centrifugal separation between starch and gluten, and therefore the screening operations for this purpose are carried out substantially in the absence of gluten, and in the absence of a substantial amount of fiber in the gluten overflow. Thus it is possible to materially simplify the screening equipment, and to minimize upon the amount of wash liquor used in the screening operations. Locating the germ screening operation after the first centrifugal treatment, and the slop screening operation after the centrifugal treatment of the Buhr mill ground slop, makes possible the elimination of filtration for the purpose of obtaining wash water for screening operations. In the present process the necessary liquid for the screen washing is obtained by the overflow from the clean up centrifuge and the limit of the quantity of this wash water is set by the overflow capable of the clean up centrifuge, which capacity is large.

In systems making use of filters to dewater starch liquor, separation of starch particles by displacement is not as effective or efficient as with the present process. In the present process there is repeated and successive separation of starch by displacement, in the centrifuges 12a, 12b and 12c. This can be explained by pointing out that with an ordinary filter for handling liquors containing starch and gluten, the liquid is removed from the solids until the filter cake retains about 50% moisture, after which the filter cake is repulped with liquor having a lower content of solubles, than the solubles content of the original liquor. Thus the resulting repulped material which is to be supplied to separation operations for removal of starch, contains solubles both from the repulping liquor, and from the original contained liquor. In contrast with such prior practice, in the present process there is direct displacement of liquor from the starch in each of the successive centrifugal separation operations. As previously pointed out this is by virtue of the introduction of wash liquor into the return circuits of each of the centrifuges, which upon entering the centrifuge rotor causes a displacement of liquor in which the starch particles originally enter in the feed, whereby the particles are carried out in the underflow with the wash liquor. As pointed out in the aforementioned patents the extent of displacement depends upon the rate with which wash water is introduced into the centrifuge rotor. The efficiency of displacement can be well above 50%, and can approach 100%, depending upon the rate with which the wash water is introduced. It can further be pointed out that introduction of wash water into the several successive stages of centrifugal separation, necessarily means that there is successive counter flow of wash water through the wet starch system, in a series of steps alternating by screening and centrifugal separation.

Fig. 2 illustrates a modification of Fig. 1, particularly with respect to the manner of taking out the germs. In this instance only that part 19 of the overflow 14 from centrifuge 12a, is passed through a screen 54, for removal of germs. These germs are merged with the remainder of the gluten overflow from centrifuge 12a, and delivered to the filter 56, where the germs act as a filter aid. The filter cake recovered from this filter contains both gluten and germs, and the water removed at this point can be returned by line 57, to the steeps 10. To subsequently separate germs from the gluten, the filter cake from filter 56 is supplied to pulping means 58, where it is supplied with water 59, as for example a part of the overflow from centrifuge 12b. The repulped material from 58 is supplied to screens 61, and separated germs are removed from these screens, after being washed in the last screening stages. Heavy gluten passing through screen 61 can undergo dewatering 60, with the removed water being dewatered to the steeps. The liquor used for washing the germs can be a part of the overflow from centrifuge 12c, shown being diverted for this purpose by line 62. After having washed the germs the water can be used for supplying the crackers 11, as indicated by line 63.

Another embodiment of the invention is illustrated in Fig. 3. In this instance gluten overflow from centrifuge 12a is passed through coarse screening 17, as in Fig. 1, for the separation of germs. The gluten liquor 66, freed of germs, is supplied in part (line 19) to the re-pulping operation 20, and in part (line 67) as a feed to the special gluten centrifuge 68. The gluten overflow 69 from centrifuge 68 is supplied to the filter 71 and the water extracted at this point is returned by line 72, to the steeps 10. Starch recovered in the underflow from centrifuge 68 is removed by line 73, and re-introduced to mix with the feed of centrifuge 12a. At least a substantial part of gluten overflow from centrifuge 12b can also be supplied to the gluten filter 71, as indicated by line 74. A part of the liquor being returned by line 41, from centrifuge 12c, can be diverted to form a wash 75, for the gluten centrifuge 68. Otherwise the process represented by Fig. 3, is substantially the same as Fig. 1. With the process of Fig. 3 it is possible to operate centrifuge 12a in such a manner that a considerable amount of starch passes out with the gluten overflow. This starch is then recovered in the centrifuge 68.

The process of Fig. 4 incorporates the recovery centrifuge as in Fig. 3, together with the arrangement for removing germs in a gluten filter cake, as in Fig. 2. Thus in this instance both the gluten water and germs from centrifuge 12a are supplied to the gluten filter 56. Water removed from this filter is returned by line 57 to the system, preferably into the steeps 10. Filter cake from filter 56 containing both gluten and germs, is supplied to the pulping means 58, where it is pulped with liquor, as for example overflow from centrifuge 12b diverted by line 59. The pulped material from 58 is treated upon the copper screens 77, whereby germs are removed. The material passing through these screens is supplied to the recovery centrifuge 78, for the separation of starch. Starch separated from gluten in this separating operation is shown being returned by line 79 to the fed for centrifuge 12a. The gluten overflow of centrifuge 78 is delivered to this filter or other dewatering equipment 81, and the water removed at this point is shown being utilized in the system, as for example by line 82, which returns such water to the steeps 10, and line 83 which returns a part of the water to the centrifuge 78 as a wash.

Fig. 5 illustrates a modified process in which flotation is used in conjunction with centrifugal separation. Thus in this case the overflow 14 from centrifuge 12a, is supplied to a simple type of flotation cell 85. The higher gravity gluten removed in this manner is supplied to the gluten filter 27, while the remaining gluten water is supplied from flotation cell 85 to the copper screens 17, for separating out the germs. Liquor passing through these screens is delivered in part to the centrifuge 12b, as in Fig. 1, and in part (line 19) to the pulping operation 20, for forming the feed to centrifuge 12a. Another flotation cell 86, is shown taking the gluten overflow from centrifuge 12b. Heavier gluten separated from the overflow, is supplied to the gluten filter 27, while the remainder is shown being returned by line 29, to the pulping operation 30. Gluten foam from 86 can be merged with the gluten passing to filter 27.

Fig. 6 illustrates another embodiment of the invention, in which provision is made to segregate germs which may pass out with the underflow of the first centrifuge. In this embodiment flotation cells are also shown associated with the centrifuges 12b and 12c. Thus in this instance the entire starch underflow from the centrifuge 12a, is discharged into a germ separator 88. The large amount of underflow continuously returned back into the centrifuge chamber is drawn off from the germ separator 88, as indicated by line 89. From the germ separator 88 germs are drawn off as indicated by line 90, and in order to avoid washing of the germs so removed, they are shown being re-introduced back into centrifuge 12a by line 90. One part 91 of the overflow from centrifuge 12a is returned back to the pulping operation 20, and another part 92 passes to the copper screens 93, where germs are removed. Circuit 91 not only returns gluten overflow to the centrifuge 12a, but also germs contained in the same. With this arrangement of germ separating means in the underflow of centrifuge 12a, this centrifuge can be designed and operated so that any germs passing out with the starch, can be directly returned back to the centrifuge, by line 90. Thus all possibility of contaminating the starch with germs is avoided, and at the same time germs passing out with the starch underflow are re-subjected to centrifugal separation.

The starch hulls and grits drawn off from germ separator 88, are shown passing through the screens 21 and 22, with the removed grits being supplied to the Buhr mill 23. The gluten overflow of centrifuge 12b is shown being supplied to a flotation cell 86, the same as in Fig. 5. A part of the gluten drawn off from cell 86 is shown being used as a wash 94 for screen 93. Gluten foam and the remainder of the gluten drawn off from cell 86, is shown being delivered to the gluten filter 27. The underflow of centrifuge 12b is shown coupled to a flotation cell 96, in a manner substantially as disclosed and claimed in Peltzer Patent No. 2,039,605. The starch drawn off from flotation cell 96, pass through the screens 36 and 37, the same as in Fig. 1. Gluten foam drawn from cell 96, is shown being delivered by line 97, to the pulping operation 30, and from thence back into the centrifuge 12b.

The underflow from centrifuge 12c (Fig. 6) is also shown connected to a flotation cell 98, in accordance with the aforesaid Patent No. 2,039,605. The starch drawn off from cell 98 passes to the starch filter 46, while the gluten draw-off 99 merges with the gluten draw-off 97, from cell 96. A certain amount of gluten water, indicated by line 101, can be drawn off from the system in order to prevent accumulation of residual solids in the system.

Fig. 7 illustrates another embodiment, in which a conventional germ separator is utilized in conjunction with the first centrifuge 12a. Thus in this instance the overflow 14 from centrifuge 12a is passed through the screens 17, and the removed germs delivered to the germ separator 103. The underflow draw-off from centrifuge 12a is also passed through a screen 104, whereby any germs and hulls present are removed and likewise delivered to the germ separator 103. The germ draw-off from separator 103 is delivered to the screens 105, whereby the germs are separated out and removed from the system. The liquor passing through the first of the series of screens 105 can be used as a wash in centrifuge 12a, as indicated by line 106. The underflow draw-off from germ separator 103, which contains starch grits, is shown being delivered to the screens 107, where the grits and hulls are separated out and after being washed, are delivered to the Buhr mill 23. As the grits leave the screens 107, they can be treated in an expeller 108, for partial dewatering. Water removed at this point is used as a wash on the first of the screens 107. The liquor passing through the initial stages of the screens 107, is shown being merged with line 106, to furnish a wash to centrifuge 12a. The last ones of both the screens 105 and 107 are supplied with wash water 109, and after passing through these screens, this liquor can be delivered to the germ separator 103, as indicated by line 111.

Continuing with respect to Fig. 7, the ground material from Buhr mill 23 is supplied to the pulping operation, and from thence to the centrifuge 12b, substantially the same as in Fig. 1. That part of the overflow of centrifuge 12b, represented by line 26, is delivered to gluten filter 27, as in Fig. 1. The underflow centrifuge 12b is treated upon the coarse and fine screens 36 and 37, as in Fig. 1, for the removal of coarse and fine slop. Also the starch liquor passing through screen 104 is merged with the starch liquor passing through screens 36 and 37, to form a feed to the final pass centrifuge 12c. The remainder of the process of Fig. 7 need not be described, since it is substantially the same as Fig. 1.

Fig. 8 is a simplified flow sheet serving to generally illustrate application of centrifugal separation immediately after the crackers. Thus the overflow from centrifuge 12a, containing gluten and germs, is shown passing to the germ removal screens 17 as in Fig. 1. Gluten liquor passing through screens 17 is in part passed to gluten dewatering operations, as in the previous flow sheets, and in part (line 43) passed to the pulping operation 20. The underflow from centrifuge 12a is coupled to the germ separator 88, as in Fig. 6, and the germ draw-off from this separator passes back to the pulping operation 20, the same as in Fig. 6. The subsequent operations in the process have been indicated by legends in Fig. 8, thus making it clear that these subsequent operations may incorporate features previously described with respect to Figs. 1 to 7 inclusive, or may be of a different character, dependent upon various requirements.

The previously described feature of having centrifugal separation follow the Buhr mill, together with separation of slop, can also be isolated from other features, as illustrated in Fig. 9. In this instance the arrangement of centrifuges 12b and 12c is substantially the same as that illustrated in the previously described flow sheets, with the Buhr mill 23 supplying its grind through the pulping operation 30, and from thence to the separating centrifuge 12b. The overflow from centrifuge 12b, consisting of gluten and filamentary fiber, is in part utilized in the pulping operation 30. The coarse and fine slop screens 36 and 37, for removal of coarse and fine slop, receive the underflow draw-off from centrifuge 12b, and the screened starch is then supplied to centrifuge 12c. A part or all of the overflow from centrifuge 12c can be used as a wash on screens 36 and 37. It will be apparent that screens 36 and 37 may serve to effectively remove fiber contained in the underflow of centrifuge 12b, without definitely isolating the removed fiber into fine and coarse slops. Legends attached to Fig. 9 illustrate the manner in which the same can be incorporated in the various flow sheets previously described, or with other starch processes which may use equipment and separating operations other than those previously described. In fact the arrangement of Fig. 9 can be introduced into a conventional type of wet starch process, to take the place of conventional slop systems for treating the Buhr mill starch, and tables for separating starch from gluten.

Fig. 10 illustrates a novel procedure whereby waters resulting from certain stages of the process can be clarified for re-use as wash water. More specifically, in accordance with Fig. 10 the steeped corn is used to filter process liquor, before the corn is delivered to the crackers. The source of the process liquors for filtration may vary in different instances, although in general the process liquors requiring clarification will be liquors contaminated with gluten, and also possibly fiber, solubles, a small percentage of starch, and minute particles of non-comminuted, possibly imperfectly steeped corn.

As is well known to those skilled in the art, conventional steeping equipment makes use of a large number of steeping tanks, which are successively filled with corn. Steeping liquor is then introduced into a charged tank and then the steeping operation is carried out at an elevated temperature. Following steeping, it is conventional practice to drain the steep water from the corn, after which the steeped corn is discharged to the crackers. Insofar as individual steeping tanks are concerned, this is essentially a batch process, except that by virtue of the use of a battery of steeping tanks, a continual supply of steeped corn is provided for the crackers.

In order to illustrate our use of the steeped corn in one or more filtering cycles, before it is discharged to the crackers, we have illustrated in Fig. 10 a number of steeping tanks 10 identified by letters *a* to *e* inclusive, and which represent the different stages in the steeping and filtering cycle. Stage *a* represents filling the steep tank with corn after which liquor is introduced into the tank, and the contents heated to an elevated temperature for a steeping operation. Operation *b* represents drainage of steep water following a steeping operation, with a part of this steep water being sent to the evaporating pans, and another part being used to steep another charge of corn. Operation *c* represents introduction of process liquor into the steeping tank, from line 116. Following introduction of this process water into the lower part of the tank, the corn settles to form a filter bed and liquid filtrate is drained from the lower portion of the tank as indicated by line 115. A further filtering cycle, preferably on a different batch of steeped corn, is shown by operation *d*. Here process water is introduced by line 117 into the upper part of the tank and the filtrate removed by line 118. Following this filtering operation or operations, and after liquor has been drained from the steeped corn, the next operation *e* consists of discharging the steeped corn to the crackers 11.

The remainder of the process, making use of the special filtering cycle described above, depends upon individual requirements. In some instances it may be desirable to use this filtering cycle in a conventional starch process making use of tabling for separation of starch from gluten. We prefer to make use of centrifuges in the manners described in the foregoing flow sheets numbered 1 to 9 inclusive. Thus the arrangement illustrated is somewhat similar to that shown in Fig. 6, in that a germ separator 88 is included in the return circuit of the centrifuge 12a, and germs drawn from this germ separator are returned back to the feed of centrifuge 12a, by line 90. The overflow from centrifuge 12a is shown passing through screens 93, for removal of germs, and the gluten liquor passing through this screen is shown being delivered to the flotation cell 121. The lower gravity draw-off 122 from this cell is returned to the pulping operation 20, while the foam and heavier gravity draw-off 123 is delivered to the gluten dewatering equipment or filter press 124. The last of screens 93 may subject the germs to washing, the wash liquor being from the filtering operation *d*, by line 118. After this washing operation the water is shown being introduced into the germ separator 88, by line 126. Also clarified or filtered process liquor from the filtering operation *c*, is shown being introduced in part into the germ separator 88, while another part may go to the steeps.

Continuing with Fig. 10, the starch underflow from germ separator 88 is treated on the screens 21, and removed grits passed to the Buhr mill 23. Material passing through screens 21 is delivered directly to the final pass centrifuge 12c, as in Fig. 6. The grind from Buhr mill 23 is supplied to the centrifuge 12b, and this centrifuge is shown with its underflow associated with flotation cell 96, and its overflow associated with flotation cell 86, the same as Fig. 6. The foam from flotation cell 96 is shown being merged with the flow 117 to the filtering cycle *d*, by line 127. Foam, representing gluten of relatively high specific gravity, from flotation cell 86, is shown being supplied to the gluten filter 124, by line 128. That part of the overflow from centrifuge 12b which is not passed through flotation cell 86, is shown passing to the filtering cycle *c*, by line 116.

The overflow from centrifuge 12c, is shown being supplied to a combination gravity thickener and flotation cell 129. The lighter gravity overflow 131, from this gravity thickener is shown being used as a wash for centrifuge 12a. The higher gravity underflow is used in the filtering cycle *d*, and is represented by line 117 previously mentioned. The foam passes to line 128.

Continuing as to Fig. 10, the underflow circuit for centrifuge 12c is provided with a flotation cell 98, the same as in Fig. 6. The foam 132 from this flotation cell is shown being merged with line 117, to be supplied back to the filtering cycle *d*.

The method of utilizing steeped corn as a filtering medium, has many advantages. It makes possible a source of clarified process water without introducing additional equipment and without materially affecting the operation of other equipment of the process. Solids contained in the process liquors treated in the filtering cycle, are retained by the steeped corn, and are reintroduced into the system together with the cracked corn. In supplying liquor to such a filtering cycle it is desirable that the liquor be preheated to steeping temperature whereby solids separated out by the steeped corn are conditioned. It will be evident that this method of utilizing steeped corn for a filtering cycle, is subject to many variations. For example in place of two filtering cycles, for process waters drawn off different parts of the system, a single filtering cycle can be employed, immediately prior to delivering the steeped corn to the crackers. Furthermore as previously pointed out, the process waters may be taken from different parts of the system, wherever there is a contaminated source of liquor, and where it is desirable to remove solids such as gluten from the liquor, before using it in preceding operations.

In all of the foregoing flow sheets no mention has been made of pH control, or of the introduction of sulphur dioxide. It is to be understood that such phases of the process can be by known methods.

We claim:

1. In a wet starch manufacturing process, where corn or like starch bearing material is subjected to steeping and cracking, the improvement comprising subjecting the cracked material to centrifugal separation, and removing germs from at least one of the centrifugally separated components.

2. In a wet starch manufacturing process, where corn or like starch bearing material is subjected to steeping and cracking, the improvement comprising subjecting the cracked material to centrifugal separation, and removing grits from the centrifugally separated underflow.

3. In a wet starch manufacturing process, where corn is subjected to steeping and cracking, the improvement comprising subjecting all of the cracked material to centrifugal separation, removing germs from at least one of the separated components, and separately removing grits from the centrifugally separated underflow.

4. In a wet starch manufacturing process, where corn is subjected to steeping followed by cracking, the improvement comprising subjecting all of the cracked material to centrifugal separation, whereby starch grits pass out in an underflow and whereby gluten together with at least a major part of the germs pass out in an overflow, and then separating germs from the gluten overflow.

5. In a wet starch manufacturing process, where corn is subjected to steeping followed by cracking, the improvement comprising subjecting all of the cracked material to centrifugal separation, whereby finely divided starch and starch grits pass out in an underflow and whereby gluten together with at least a major part of the germs pass out in an overflow, and then subjecting the overflow to screening for the removal of germs.

6. In a wet starch manufacturing process where corn or like starch bearing material is subjected to steeping followed by cracking, the improvement comprising subjecting all of the cracked material to centrifugal separation, whereby finely divided starch and starch grits pass out in the underflow and whereby gluten and at least a major part of the germs pass out in an overflow, utilizing a part of the gluten overflow for pulping the cracked material, to form a feed to the centrifuge, and removing germs from the overflow.

7. In a wet starch manufacturing process where corn is subjected to steeping followed by cracking, the improvement comprising subjecting the cracked material to centrifugal separation, whereby a major part of the starch passes out in an underflow and a major part of the free gluten, together with a major part of the germs, pass out in an overflow, removing germs from the overflow, removing germs passing out in the underflow, and returning the germs removed from the underflow back to the centrifugal separating operation.

8. In a wet starch manufacturing process where corn is subjected to steeping followed by cracking, the improvement comprising subjecting all of the cracked material to centrifugal separation, whereby finely divided starch and starch grits pass out in an underflow and gluten together with a major part of the germs pass out in an overflow, subjecting the overflow to screening for the removal of germs, subjecting the underflow to flotation for removal of residual germs, using a part of the gluten overflow for pulping the cracked material, to form a feed to the centrifugal operating operation, and also introducing germs removed by said flotation operation back into the feed to said centrifugal separating operation.

9. In a wet starch manufacturing process where corn is subjected to steeping followed by cracking, the improvement comprising subjecting all of the cracked material to centrifugal separation, whereby finely divided starch and starch grits pass out in an underflow and whereby gluten together with at least a major part of the germs passes out in an overflow, removing germs from the overflow, subjecting at least a part of the overflow, after removal of germs, to centrifugal separation, whereby as a result of said last-named centrifugal separation recovered starch passes out in the underflow and gluten passes out in an overflow.

10. In a wet starch manufacturing process, where corn is subjected to steeping followed by cracking and wet separating operations to produce starch grits, and after which the starch grits are ground, the improvement comprising subjecting the material resulting from the grinding of the grits to centrifugal separation, whereby gluten and some fiber pass out in an overflow and whereby starch together with remaining fibrous material passes out in an underflow, and then subjecting the underflow to screening for the removal of fiber contained therein.

11. In a wet starch manufacturing process, where corn is subjected to steeping followed by cracking, subjecting the cracked material to separation to remove starch grits and hulls, and grinding of the grits and hulls in a mill, the improvement comprising directly subjecting the material from the mill to centrifugal separation, whereby gluten together with some fiber passes out in an overflow and whereby starch together with remaining fibrous material passes out in an underflow, utilizing a part of the gluten overflow for pulping the grind from the mill, to make up a feed to be supplied to the centrifugal separating operation, and subjecting the starch underflow to screening for removal of fiber contained therein.

12. In a wet starch manufacturing process, where corn is subjected to steeping followed by cracking, the improvement comprising subjecting all of the cracked material to a stage of centrifugal separation, whereby finely divided starch, hulls and starch grits pass out in an underflow and whereby free gluten together with at least a major part of the germs passes out in an overflow, removing germs from the overflow, subjecting the underflow to screening for the removal of grits, subjecting the grits to grinding, subjecting the grind to a second stage of centrifugal separation whereby gluten and some fiber passes out in a gluten overflow and whereby starch together with remaining fiber passes out in an underflow, and then subjecting the underflow to screening for the removal of all fiber contained therein.

13. In a wet starch manufacturing process, where corn is subjected to steeping followed by cracking, the improvement comprising directly subjecting the cracked material to a stage of centrifugal separation, whereby both finely divided starch and grits pass out in an underflow and whereby gluten and at least a major part of the germs pass out in an overflow, removing germs from the overflow, subjecting the underflow to screening for the removal of grits, grinding the grits, subjecting the grind to a second stage of centrifugal separation whereby gluten together with some fiber passes out in an overflow and whereby starch together with remaining fiber passes out in an underflow, subjecting the underflow to screening for removal of fiber contained therein, subjecting the starch passing through said last-named screening operation to a final stage of centrifugal separation, and also supplying finely divided starch from said first-named screening operation to said final stage of centrifugal separation.

14. In a wet starch manufacturing process, where corn is subjected to steeping followed by cracking, the improvement comprising directly subjecting the cracked material to an initial stage of centrifugal separation, whereby both finely divided starch and grits pass out in an underflow and whereby gluten and at least a major part of the germs pass out in an overflow, removing germs from the overflow, utilizing a part of the overflow to pulp the cracked material for forming a feed to the initial stage of centrifugal separation, subjecting the underflow to screening for the removal of grits, subjecting the grits to grinding, subjecting the grind to a second stage of centrifugal separation whereby gluten and fiber of a filamentary nature pass out in an overflow and whereby starch and remaining fiber pass out in an underflow, utilizing at least a part of the overflow to pulp the grind, to form a feed to the second stage of centrifugal separation, and screening the underflow from the second stage of centrifugal separation for removal of fiber contained therein.

15. In a wet starch manufacturing process, where corn is subjected to steeping prior to delivery of the same to crackers, the improvement comprising utilizing a mass of the steeped corn, prior to delivery of the same to the crackers, as a filtering medium for clarification of process liquor.

16. In a wet starch manufacturing process, where corn is subjected to steeping prior to delivery of the steeped corn to crackers, and after which the cracked material is subjected to separating operations for the removal of starch, germs, and fiber, the improvement comprising utilizing said steeped corn, prior to supplying the same to the crackers, as a filtering medium for process liquor drawn off in said separation operations, and returning the clarified liquor as a result of such filtering cycle, back to the process.

17. In a wet starch manufacturing process, where corn is subjected to batch steeping in tanks before supplying the same to crackers, and where the cracked material is subjected to wet separating operations for separate removal of starch, germs and fiber, the improvement comprising draining a batch of steeped corn, introducing into the steeping tank gluten contaminated process liquor diverted from said separating operations, permitting said process liquor to filter through the bed of steeped corn, returning the clarified process liquor to the process, and then delivering the steeped corn to the crackers.

18. In a wet starch manufacturing process, where corn is subjected to steeping in steep tanks prior to delivery of the steeped corn to crackers, and where the cracked starch bearing material is subjected to wet separating operations for the removal of separate components including starch, gluten, fiber and germs, the improvement comprising draining a batch of corn in a steep tank immediately following a steeping operation, diverting from said separating operations a gluten contaminated liquor and introducing the same into the steep tank, draining clarified liquor from the lower portion of the tank while the steeped corn acts as a filtering medium to remove solids, and utilizing the clarified process liquor in said separating operations.

19. In a wet starch manufacturing process, where corn or like starch bearing material is subjected to steeping followed by cracking, the improvement comprising subjecting the cracked material to centrifugal separation, whereby finely divided starch and starch grits pass out in an underflow, and whereby gluten together with germs pass out in an overflow, screening the underflow for removal of grits from the same, subjecting the grits to grinding, and subjecting the ground material to further separation for removal of starch contained therein.

20. In a wet starch process where corn or like starch bearing material is subjected to steeping followed by cracking, the improvement comprising subjecting the cracked material to centrifugal separation whereby finely divided starch together with starch grits and hulls pass out in an underflow and gluten together with germs pass out in an overflow, screening the underflow for removal of hulls and grits from the same, subjecting the grits to grinding, subjecting the ground material to further centrifugal separation whereby starch is removed in an underflow and gluten in an overflow, and then subjecting the underflow to fine screening.

21. In a starch manufacturing process where corn is subjected to steeping followed by cracking to form a wet slurry, the steps of subjecting the slurry to a centrifugal separating operation, the separating operation being characterized by introduction of a wash liquor, whereby starch, grits and hulls are removed with liquid of the wash as an underflow, and whereby gluten and germs are removed in an overflow, subjecting the underflow material to a further separating operation for removal of the starch content of the same, supplying a wash liquor to said last named separating operation whereby separated starch is withdrawn with liquid of the wash as an underflow and gluten withdrawn in an overflow, and using liquor obtained from said overflow as said first named wash liquor.

22. In a starch manufacturing process in which corn is subjected to steeping followed by cracking to form a wet slurry, subjecting the slurry to a centrifugal separating operation whereby starch, grits and hulls are removed in an underflow, and whereby gluten and germs are removed in an overflow, supplying a wash liquor to the zone of centrifugal separation thereby causing a displacement action with the liquid of the underflow consisting largely of said wash liquor, screening the underflow to remove grits and hulls, subjecting the grits and hulls to grinding, subjecting the ground material and also the screened material to a further centrifugal separating operation whereby starch is removed in an underflow and gluten in an overflow, supplying a wash liquor to the separating zone of said last named separating operation, whereby the liquor of the underflow from the same consists largely of the last named wash liquor, and using at least a part of the liquor from the overflow from the last named separating operation to increase the moisture content of the slurry supplied to the first named separating operation.

23. In a wet starch manufacturing process where corn is subjected to steeping followed by cracking, the improvement comprising subjecting the cracked material to centrifugal separation, whereby finely divided starch and starch grits pass out in an underflow, and whereby free gluten together with a major part of the germs pass out in an overflow, subjecting the underflow material to further separating operations for removal of starch therefrom, dewatering the overflow to form a filter cake consisting of gluten together with germs, utilizing liquor thus obtained in operations of the process preceding centrifugal separation, pulping said filter cake with liquor extracted from operations on the underflow material, and then removing germs from the pulped material.

24. In a wet starch manufacturing process where corn is subjected to steeping followed by cracking, the improvement comprising subjecting all of the cracked material to centrifugal separation, whereby finely divided starch and starch grits pass out in an underflow and whereby gluten and at least a major part of the germs pass out in an overflow, subjecting the underflow material to further separating operations for removal of starch therefrom, dewatering at least a part of the gluten overflow to produce a filter cake consisting of gluten together with germs, utilizing liquor thus obtained in operations of the process preceding centrifugal separation, repulping said filter cake with liquor extracted from operations on the underflow material, subjecting the repulped material to screening for the removal of germs therefrom, subjecting the liquor after such removal of germs to centrifugal separation, whereby as the result of said last named centrifugal separation starch recovered from said liquor passes out in an underflow and gluten passes out in an overflow, and utilizing liquor of the overflow in operations of the process preceding the first named centrifugal separating operation.

25. In a wet starch manufacturing process, where starch or like starch bearing material is subjected to steeping and cracking, the improvement comprising subjecting the wet cracked material to centrifugal separation, whereby germs and gluten pass out in the overflow and finely divided starch together with starch grits pass out in an underflow, extracting liquor from the overflow for reuse in the process, subjecting the underflow to further treatment for recovery of its starch content, said treatment including grinding the grits and subjecting the ground material to further separation and yielding additional process liquor, and reusing said process liquors in the process, the first named liquor being reused for steeping and the second named liquor being reused for operations subsequent to steeping.

26. In a wet starch manufacturing process, where starch or like starch bearing material is subjected to steeping and cracking, the improvement comprising subjecting the wet cracked material to centrifugal separation, whereby germs and gluten pass out in the overflow and finely divided starch together with starch grits pass out in an underflow, extracting liquor from the overflow for reuse in the process, subjecting the underflow to further treatment for recovery of its starch content, said treatment including grinding the grits and subjecting the ground material to further separation and yielding additional process liquor, and reusing said process liquors in the process, the first named liquor being reused for steeping and a part of the second named liquor being reused as wash in the centrifugal separating operation.

27. In a wet starch manufacturing process, where corn is subjected to steeping followed by cracking, the improvement comprising subjecting all of the cracked material to centrifugal separation, whereby finely divided starch and starch grits pass out in an underflow and whereby gluten together with at least a major part of the germs and a minor part of the starch passes out as overflow, separating germs from the overflow, screening out starch grits from the underflow, grinding the grits, and then separating starch from the ground material.

ALBERT PELTZER.
ALBERT PELTZER, Jr.